United States Patent
Cihlar et al.

(10) Patent No.: US 7,666,279 B2
(45) Date of Patent: Feb. 23, 2010

(54) STRUCTURE FOR EXTREME THERMAL CYCLING

(75) Inventors: Steve M. Cihlar, St. Charles, IL (US); Dale A. Swanson, Aurora, IL (US); Randy L. Eberly, Plainfield, IL (US)

(73) Assignee: Chicago Bridge & Iron Company, Plainfield, IL (US)

( * ) Notice: Subject to any disclaimer, the term of this patent is extended or adjusted under 35 U.S.C. 154(b) by 477 days.

(21) Appl. No.: 11/376,802

(22) Filed: Mar. 16, 2006

(65) Prior Publication Data

US 2007/0215452 A1 Sep. 20, 2007

(51) Int. Cl.
*B01D 3/00* (2006.01)
*C10B 7/04* (2006.01)

(52) U.S. Cl. .............. 202/239; 202/242; 202/266; 202/268; 202/267.1

(58) Field of Classification Search .......... 202/239, 202/242, 268, 266, 267.1; 285/381.1
See application file for complete search history.

(56) References Cited

U.S. PATENT DOCUMENTS

| | | | | |
|---|---|---|---|---|
| 5,804,038 | A * | 9/1998 | Nelsen | 201/39 |
| 6,066,237 | A * | 5/2000 | Kindersley | 202/242 |
| 6,470,706 | B1 | 10/2002 | Engdahl | |
| 6,751,852 | B2 * | 6/2004 | Malsbury et al. | 29/722 |
| 6,926,807 | B2 * | 8/2005 | Bosi et al. | 202/162 |
| 6,989,082 | B2 * | 1/2006 | Malsbury et al. | 202/246 |

\* cited by examiner

*Primary Examiner*—N. Bhat
(74) *Attorney, Agent, or Firm*—Osha • Liang LLP

(57) ABSTRACT

A structure for extreme thermal cycling has a support element that supports a vessel primarily by bearing and frictional forces rather than by welds. The support element has a bearing portion that tapers inwardly beneath a knuckle that separates a cylindrical section of the vessel from a sloped lower section. The bearing portion of the support element follows that slope, providing an extended area of contact between the support element and the vessel. An annular section of the support element can be heated and expanded before placing it around the cylindrical section of the vessel to provide pre-stressing. If required, a strap may extend downwardly from the vessel over an upper edge of the support element.

21 Claims, 3 Drawing Sheets

STRUCTURE FOR EXTREME THERMAL CYCLING

BACKGROUND OF THE INVENTION

The present invention relates generally to structures used in industrial processing of large volumes of heated material. In particular, the invention relates to pressure-tight vessels that could be used for delayed petroleum coking.

Delayed petroleum coking is a process in which a petroleum fraction is heated to a temperature at which it thermally decomposes to provide a solid coke product and a hydrocarbon distillate product. In general, a liquid petroleum feed stock is first distilled until the lighter ends have been recovered and a heavy residuum remains. This heavy residuum of heated pitch and cat-cracked heavy or cycle oil is charged to the bottom of a structure called a coke drum.

Coke drums are vertically-disposed pressure vessels that are commonly 12 to 32 feet in diameter with a 30- to over 80-feet tall cylindrical section. A coke drum typically has a conical bottom section to provide uniformity of support stresses in the structure, and is supported by a skirt that is welded to or near a transition knuckle between the cylindrical section and the conical bottom section.

In the coke drum, the heavy residuum is further heated to about 1000 degrees F. and undergoes extensive and controlled cracking and coking under high-pressure conditions. A cracked lighter product rises to the top of the coke drum in a process called steam stripping and is drawn off.

A heavier product remains and cracks to coke, a solid, coal-like substance. The coke is usually purged with steam to remove any remaining volatile components. After the cracking and coking process is complete, quench water is introduced and high-pressure water jets are used to cut away and remove the coke. The water reduces the temperature in the drum to around 200 degrees F. or less before a new cycle begins. In order to increase production speed, the quenching operation is often done as quickly as possible. The cycle time for a vessel is typically 48 hours or less.

The heating and quenching cyclic operations of vessels such as coke drums cause deterioration of the structure over time. Vessels subjected to such extreme thermal cycling may experience a failure in the area where the support skirt is welded to the vessel shell. Cracking and structural failure of the support skirt, the vessel wall, and/or the attachment weld may occur.

A structure that is more resistant to cracking and other fatigue-related failures would be advantageous.

BRIEF SUMMARY OF THE DISCLOSURE

The applicants have developed a new structure for holding substances during extreme thermal cycling. The vessel in which the substances are held can have a conventional shape, with a tall cylindrical section and a sloped lower section that extends beneath a knuckle. Unlike prior designs, the vessel is supported by a new kind of support element that may not need to be welded to the vessel. Reducing the amount of welding between the vessel and the support element results in a more flexible connection that may reduce fatigue. It may also reduce stresses that result from weld shrinkage, weld-induced heat-affected zones in the steel, and high local stresses, all helping to improve fatigue resistance.

Rather than using welds, the new support element supports the vessel primarily by bearing and frictional forces. It includes a bearing section that tapers inwardly beneath the knuckle, following the slope of the lower section of the vessel. This bearing section provides a larger area of contact between the vessel and the support element, which may also reduce thermally-induced stresses in both the vessel and the support element by providing a more uniform temperature gradient between the vessel and the support element. A more uniform temperature gradient may also improve the fatigue resistance of the structure.

Optionally, the support element can include either a continuous skirt wall or a set of bearing plates that are mounted on a framework of structural members. An annular upper section can wrap around the cylindrical section of the vessel, and can be heated before the vessel and the support element are brought together to provide pre-stressed support. Also, a layer of high-temperature mastic can be applied between the vessel and bearing surfaces on the support element to further improve thermal conductance between the two components.

BRIEF DESCRIPTION OF THE DRAWINGS

The invention may be better understood by referring to the accompanying drawings, in which.

DETAILED DESCRIPTION OF THE INVENTION

Figure 1:
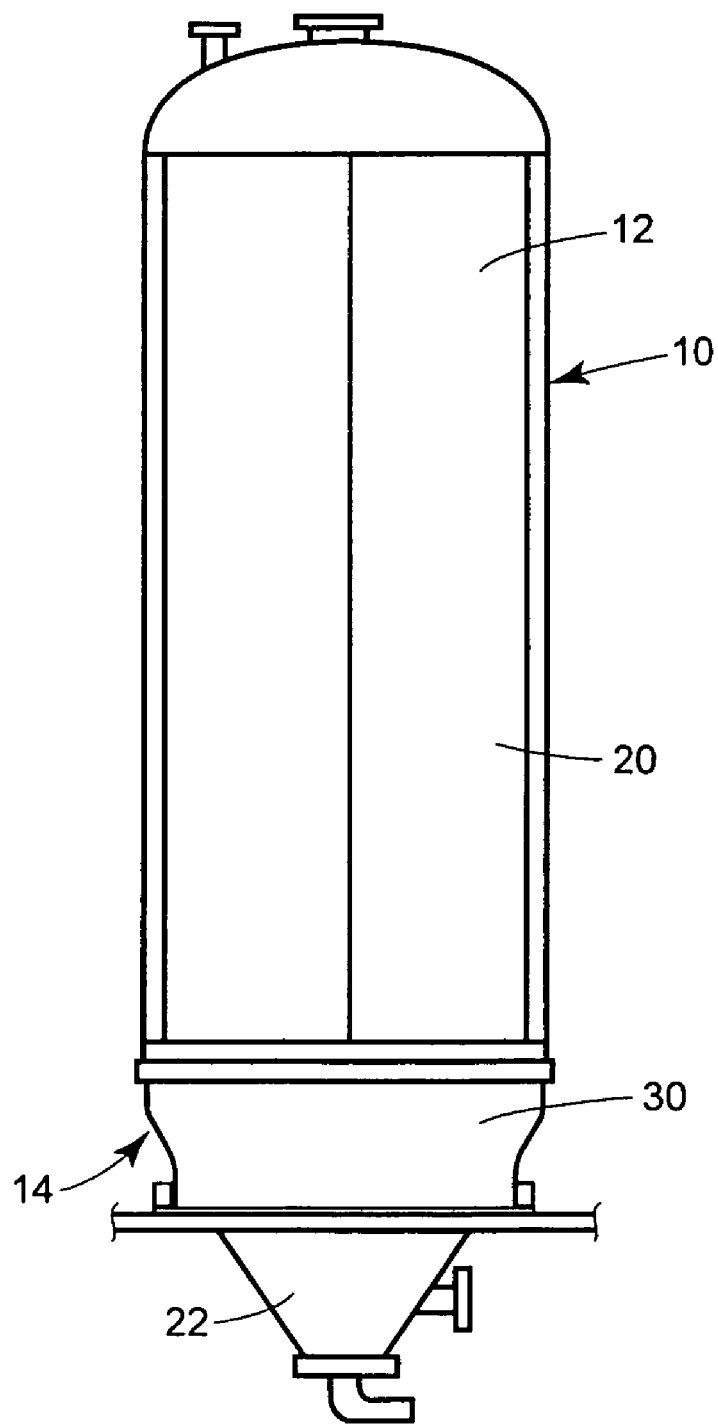
FIG. 1 is an elevational view of one embodiment of a structure that incorporates the invention.
Figure 2:
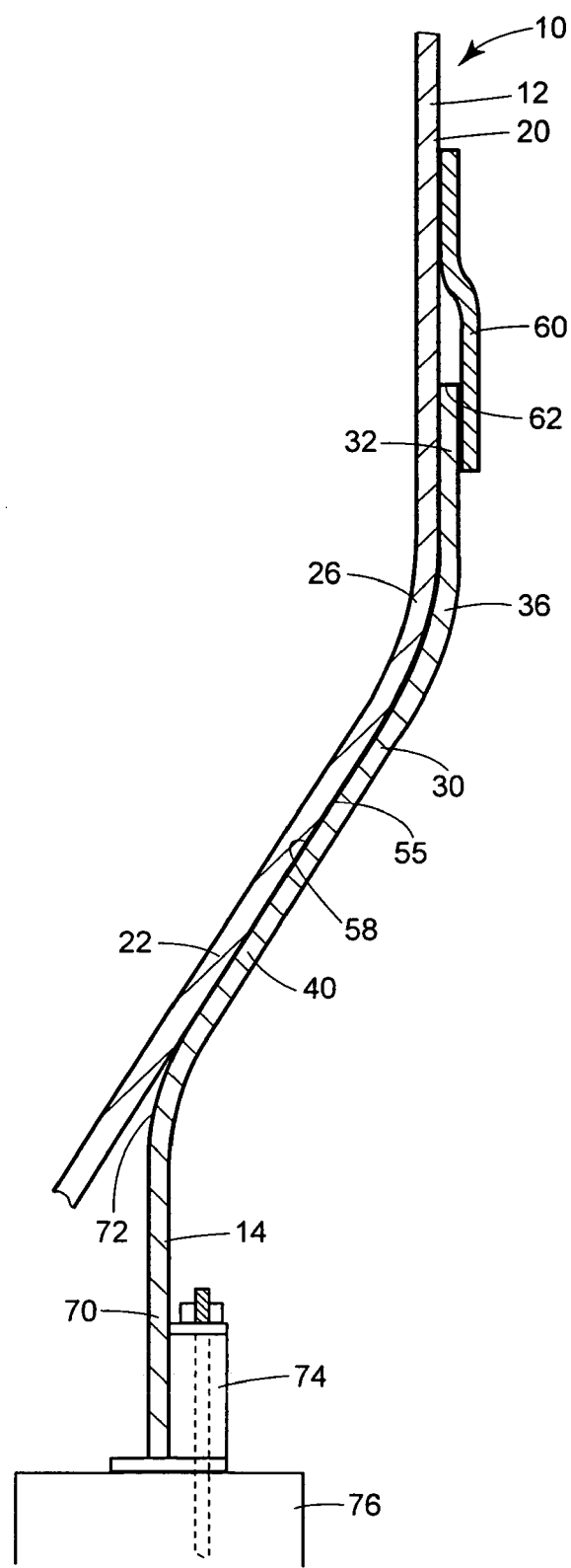
FIG. 2 is an enlarged, fragmentary cross-sectional view through a portion of the structure seen in FIG. 1.

The coke drum 10 seen in the FIGS. 1 and 2 is an example of a structure using the present invention. In general, it includes a vessel 12 and a support element 14.

The vessel 12 has a cylindrical section 20 and a sloped lower section 22. A typical cylindrical section in a coke drum can have a height of 30 to over 80 feet and a diameter of 12 to 32 feet. In coke drums, the cylindrical section is often made of welded steel plates that have a nominal thickness of approximately ¾-2½ inches or greater. The lower section of the vessel generally extends beneath a knuckle 26 that separates the cylindrical section from the lower section. In this example, the lower section is a conical section that is common on coke drums. The angle of the cone on the conical section may vary. While the illustrated arrangement is typical, other vessel arrangements can be used.

Figure 3:
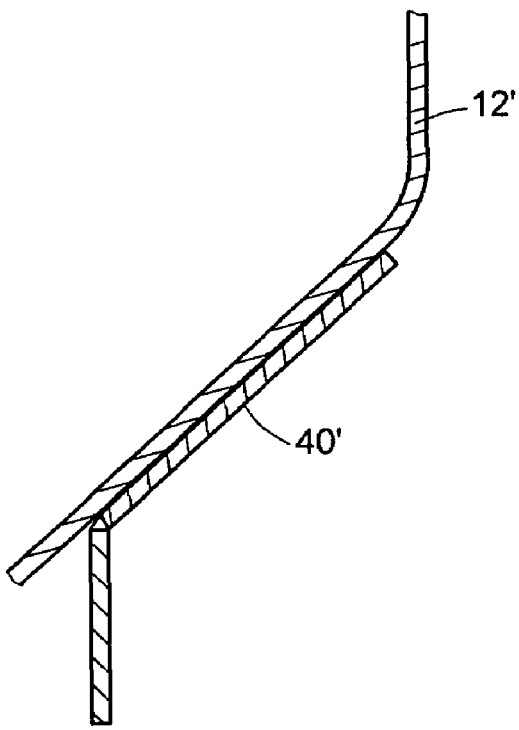
FIG. 3 is a fragmentary cross-sectional view through a corresponding portion of a structure in which the support structure does not include the use of knuckles.

The illustrated support element 14 supports the vessel 12 without welds. This example includes a continuous skirt wall 30 with an annular upper section 32 that wraps around a portion of the cylindrical section 20 of the vessel. In this example, the skirt wall includes a knuckle 36 that matches the knuckle 26 of the vessel. A bearing portion 40 of the skirt wall tapers inwardly beneath the knuckle of the vessel, following the slope of the lower section 22 of the vessel. Although all portions of the illustrated skirt wall follow the contours of the vessel, in other examples some portions of the skirt wall can deviate from the vessel contour. Alternatively, the skirt could be constructed without a knuckle. It could have, for example, a lower conical portion that is welded directly to a cylindrical section that surrounds the cylindrical section of the vessel. Or, as seen in FIG. 3, it might consist of just a conical bearing portion 40' in which the vessel 12' sits.

Figure 4:
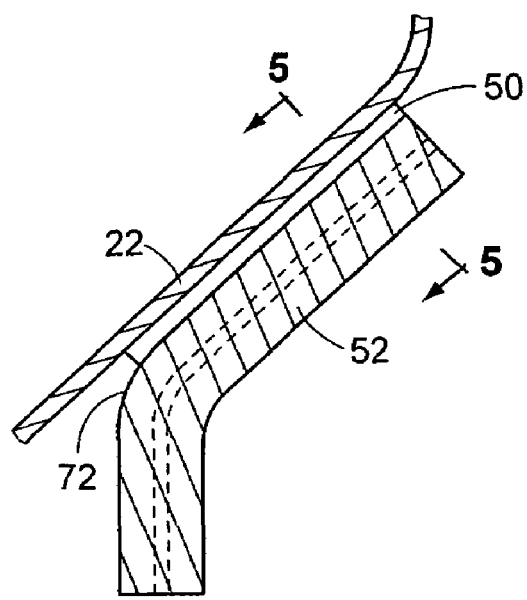
FIGS. 4 and 5 are enlarged fragmentary cross-sectional and end views of the same corresponding portion of a structure that uses alternative support details.
Figure 5:
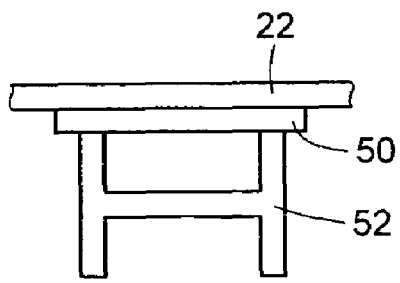

The skirt wall 30 need not be continuous. As seen in FIGS. 4 and 5, for example, it could be constructed of bearing plates 50 mounted on a framework of structural members 52, such as H-beams.

The illustrated skirt wall 30 provides an extended area of contact with the vessel 12. In a typical prior art arrangement, the primary contact between the supporting skirt and vessel is at the weld line between the knuckle and the skirt. In a 25-foot diameter vessel, this results in most forces between the vessel and the support element passing through a narrow area that includes as little as about 13 square feet of material at or near the knuckle. In the illustrated example, where the vessel is supported circumferentially by a structure that provides an annular contact surface exceeding 18" in width, the total area of contact between the skirt wall 30 and the vessel 12 may easily exceed 1000 square feet, more than an order of magnitude greater than in the corresponding prior art arrangement. This increased contact area may improve thermal conductance between the skirt wall and the vessel, reducing the peak stresses that either the skirt or the vessel will experience during thermal cycling. In the illustrated arrangement, most of the contact between the vessel and the support element 14 is between the support element and the lower section 22 of the vessel, though other arrangements may be preferred in other settings.

The support element 14 can be heated and expanded before being joined to the vessel 12. This can provide a "press-fit" between the vessel and the support element when the two elements reach thermal equilibrium. The tight fit may improve the structural load capacity of the assembly, and press fitting the cylindrical section 20 of the vessel in the annular upper section 32 of the support element may pre-stress the vessel in a compressive state. Pre-stressing the vessel in a compressive state may in turn reduce peak tensile stresses during thermal cycling, and thus further improve fatigue resistance of the structure.

To improve thermal conductance between the support element 14 and the vessel 12, a layer of high-temperature mastic 55 can be applied between the vessel and a bearing surface 58 on the support element.

If needed, one or more straps 60 can be mounted to the cylindrical section 20 of the vessel 12, extending downwardly over an upper edge 62 of the support element 14. These straps may help to hold the top of the support element against the vessel, or to transfer shear or uplift from one to the other.

The support element 14 can be mounted in place in a variety of ways. The support element shown in the figures has a relatively-cylindrical base section 70 that is welded to a reverse-curvature knuckle 72 at the lower end of the bearing portion 40 of the support element. Again, in some circumstances the knuckle could be replaced by a cone-to-cylinder weld. The illustrated base section includes conventional chairs 74 that are used to mount the base section to a foundation 76. Other anchor point supports could also be used.

This description of various embodiments of the invention has been provided for illustrative purposes. Revisions or modifications may be apparent to those of ordinary skill in the art without departing from the invention. The full scope of the invention is set forth in the following claims.

The invention claimed is:

1. A structure for holding substances that are subject to thermal cycling between temperatures that vary by more than about 500 degrees F., that has:
a pressure-tight vessel that has a sloped lower section that extends beneath a knuckle; and
a support element that tapers inwardly beneath the knuckle of the vessel, wherein such support element contacts and bears against the sloped lower section of the vessel, supporting the vessel primarily by bearing and frictional forces, and extends downward to a foundation carrying the weight of the vessel to the foundation.

2. A structure as recited in claim 1, in which the support element has a pre-stressed cylindrical section that surrounds a portion of a cylindrical section of the vessel.

3. A structure as recited in claim 1, in which there is a layer of high-temperature mastic between the vessel and a bearing surface on the support element.

4. A structure as recited in claim 1, in which the support element includes a continuous skirt wall.

5. A structure as recited in claim 1, in which the support element includes bearing plates that are mounted on a plurality of structural members.

6. A structure as recited in claim 1 in which the support element has an annular upper section that wraps around a portion of a cylindrical section of the vessel.

7. A structure as recited in claim 1 in which most of the contact between the vessel and the support element is between the support element and the sloped lower section of the vessel.

8. A structure as recited in claim 1, in which the support element supports the vessel without welds.

9. A structure as recited in claim 1, in which the support element supports the vessel without welds to the knuckle on the vessel.

10. A structure as recited in claim 1, in which one or more straps extend downwardly from the vessel over an upper edge of the support element.

11. A structure as recited in claim 1, in which the support element has a base section that extends downwardly from a reverse-curvature knuckle adjacent the sloped lower section of the vessel.

12. A structure as recited in claim 1, in which the support element has a cylindrical base section that extends downwardly from the sloped lower section of the vessel.

13. A structure as recited in claim 1, in which the support element has a base section that is welded to a sloped bearing portion of the support element.

14. A structure as recited in claim 1, in which the support element extends to one or more anchor point supports spaced away from the vessel.

15. A structure as recited in claim 1, in which the support element has an extended area of contact with the vessel.

16. A structure as recited in claim 1, in which the support element has an annular bearing portion that contacts and substantially surrounds the vessel and is at least 18 " wide.

17. A structure as recited in claim 1, in which the vessel is a coke drum.

18. A structure as recited in claim 1, in which the vessel has a diameter of at least 12 feet.

19. A structure for holding substances that are subject to thermal cycling between temperatures that vary by more than about 500 degrees F., that has:
a pressure-tight vessel that has a sloped lower section that extends beneath a knuckle; and
a support element that tapers inwardly beneath the knuckle of the vessel, wherein such support element contacts and bears against, but is not physically attached to, the sloped lower section of the vessel, supporting the vessel primarily by bearing and frictional forces, and extends downward to a foundation carrying the weight of the vessel to the foundation.

20. A structure for holding substances that are subject to thermal cycling between temperatures that vary by more than about 500 degrees F., that has:

a pressure-tight vessel that has a sloped lower section that extends beneath a knuckle; and a support element that tapers inwardly beneath the knuckle of the vessel, wherein such support element contacts and bears against the sloped lower section of the vessel, supporting the vessel primarily by bearing and frictional forces in a non-pressure-tight, non-liquid-tight arrangement, and extends downward to a foundation carrying the weight of the vessel to the foundation.

21. A structure for holding substances that are subject to thermal cycling between temperatures that vary by more than about 500 degrees F., that has:

a vessel that has a sloped lower section that extends beneath a knuckle; and a support element that tapers inwardly beneath the knuckle of the vessel, wherein such support element contacts and bears against the sloped lower section of the vessel, supporting the vessel primarily by bearing and frictional forces, and extends downward to a foundation carrying the weight of the vessel to the foundation.

* * * * *